(12) United States Patent
Chayut

(10) Patent No.: US 6,574,728 B1
(45) Date of Patent: Jun. 3, 2003

(54) CONDITION CODE STACK ARCHITECTURE SYSTEMS AND METHODS

(75) Inventor: Ira G. Chayut, San Jose, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/371,967

(22) Filed: Aug. 10, 1999

(51) Int. Cl.[7] .................... G06F 15/00; G06F 9/30; G06F 9/40
(52) U.S. Cl. ................ 712/234; 712/233; 712/226
(58) Field of Search .................. 712/236, 235, 712/237, 238, 234, 240, 233, 226, 239; 711/132

(56) References Cited

U.S. PATENT DOCUMENTS

| | | | | |
|---|---|---|---|---|
| 3,577,189 A | * | 5/1971 | Cocke et al. | 712/219 |
| 5,125,092 A | * | 6/1992 | Prener | 717/6 |
| 5,193,157 A | * | 3/1993 | Barbour et al. | 712/234 |
| 5,517,628 A | * | 5/1996 | Morrison et al. | 712/234 |
| 5,659,722 A | * | 8/1997 | Blanner et al. | 712/234 |
| 5,689,695 A | | 11/1997 | Read | |
| 5,991,868 A | * | 11/1999 | Kamiyama et al. | 712/234 |
| 6,052,776 A | * | 4/2000 | Miki et al. | 712/233 |

OTHER PUBLICATIONS

IBM Technical Disclosure Bulletin, Jul. 1988; IBM, NN8807294, "Multiple Queued Condition Codes", vol. 31, Issue No. 2, pp 294–296.*

Hammacher, Vranesic, Zaky, "Computer Organization", Copyright 1984, McGraw–Hill, Inc, ISBN 0–07–025683–7, pp. 27–30.*

* cited by examiner

*Primary Examiner*—Thomas Lee
*Assistant Examiner*—James K. Trujillo
(74) *Attorney, Agent, or Firm*—James J. Murphy, Esq.; Winstead Sechrest & Minick, P.C.

(57) ABSTRACT

A computer system includes a register file and an arithmetic logic unit (ALU) for reading data from the register file. The ALU is configured to conduct data processing of the data which was and to store the results of the data processing in the register file. The computer system further includes a condition code stack configured to hold data indicative of the context results of the data processing by the ALU. The ALU is further configured to query the condition code stack for predetermined bit values to determine operations controlled by the ALU. In particular, value of a specified data item in a condition code stack is queried, and the queried value of the data item is used to implement transfer control.

13 Claims, 3 Drawing Sheets

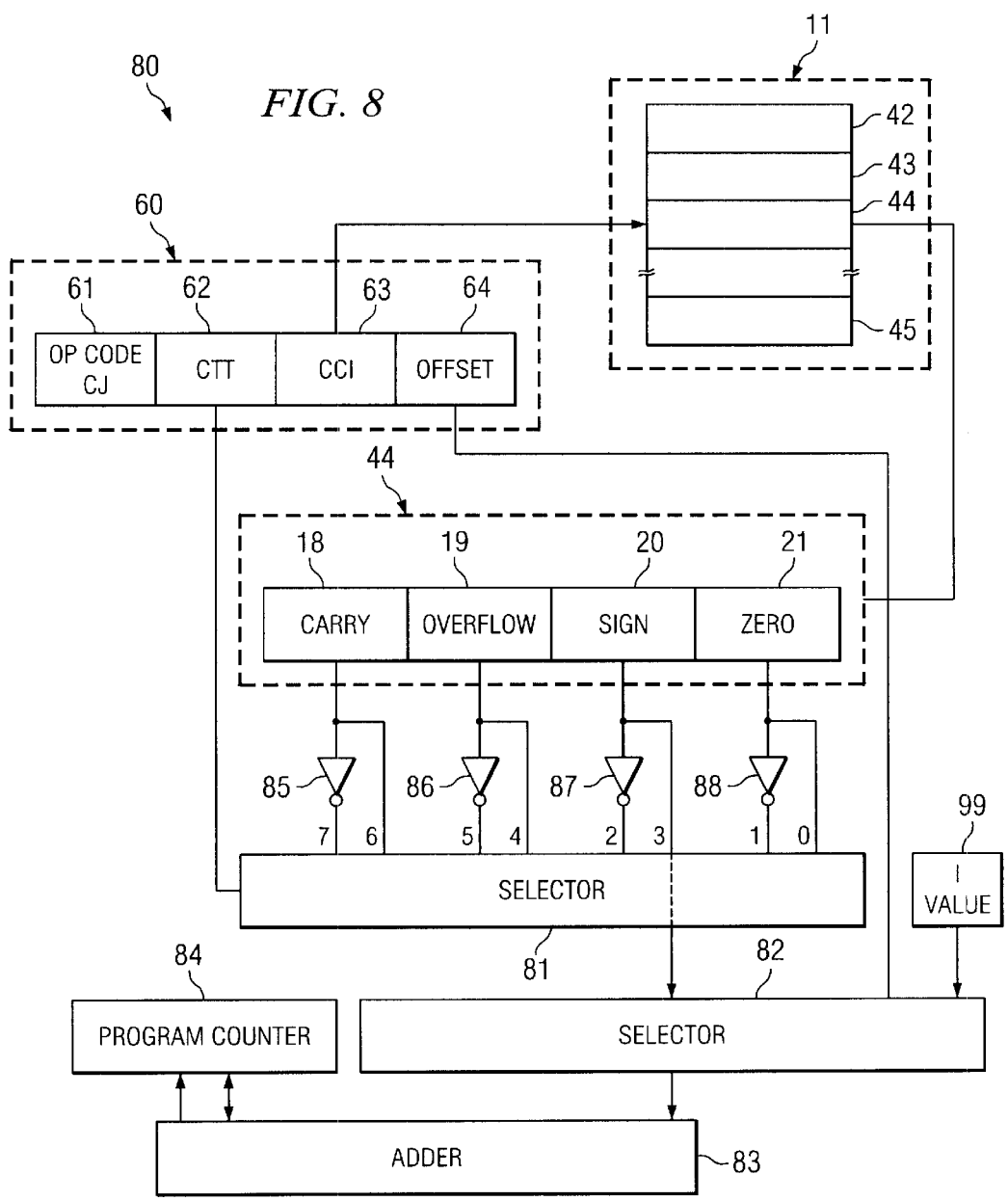
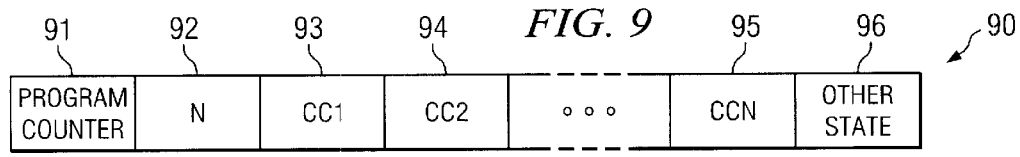

CONDITION CODE STACK ARCHITECTURE SYSTEMS AND METHODS

BACKGROUND OF THE INVENTION

1. Field of the Invention

This application relates to computers and computer operations, and more particularly to condition code stack architecture systems and methods used in computer systems.

2. Description of Related Art

The related art includes U.S. Pat. No. 5,517,628 "Computer with Instructions that Use an Address Field to Select Among Multiple Condition Code Registers," granted to Gordon E. Morrison, Christopher B. Brooks, and Frederick G. Gluck of Biax Corporation, on May 14, 1996. As described in the '628 patent, condition code register files are distinct from a computer's general purpose register file. The condition code register file has a plurality of addressable condition code registers. The computer executes condition-setting instructions that produce condition code values for storage in condition code registers. Conditional branch instructions branch to a target based upon analysis of a condition code value from one of the condition code registers. The condition code registers are directly addressable by condition code address fields of the instructions. The contextual information of the condition code registers is stored as bits associated with the respective processor elements. These bits are used for branching and are the result of executing certain comparison and test instructions. In the '628 patent, the processor has multiple sets of condition code registers. The processor's arithmetic and logical operations alter a condition code register state, and that state is available even after execution of other arithmetic and logical operations. Further, the processor's control transfer operations can specify which of the condition code registers is to be the basis for a jump. Unfortunately, use of a register file of condition codes requires complex management software, such as compiler software for example. This software is needed to manage which of the sets of condition codes will be used in each instruction. Additionally, the '628 patent requires excessive bit processing in arithmetic, logical, and control transfer instructions to specify the identity of the required condition code register to be used with the applicable instruction. This consumes excessive instruction code space.

SUMMARY OF THE INVENTION

According to one embodiment of the present invention, a program status word in a computer system architecture includes condition codes stored in a selfmanaging stack which does not require management or compiler software for operational enablement. According to the present invention, predetermined bits in a control transfer instruction such as a conditional jump instruction identify the applicable condition code register to be used with a control transfer instruction. However, no bits need to be identified for arithmetic and logical instructions for use with the particular instructions, thereby saving considerable instruction code space. According to another embodiment of the present invention, a computer system includes a register file and an arithmetic logic unit (ALU) for reading data from said register file, and storing the results of processing read data in said register file, as well as storing in a condition code stack context data indicative of the results of data processing by said processor. The ALU is configured to query the condition code stack for predetermined bit values to determine operations controlled by the ALU.

BRIEF DESCRIPTION OF THE DRAWINGS

FIG. 8 is a diagram of a selection system including an instruction register containing a conditional jump instruction referencing a particular condition code, a condition code stack including the particular condition code referenced by the instruction register, first and second selector mechanisms respectively, an adder, a program counter, and first and second inverters respectively for setting complement values to negative and value contents of condition code entries of negative and value, according to one embodiment of the present invention; and FIG. 9 is a diagram of the construction of a program status word including a program counter field, a plurality of condition code fields, and an other state field, according to the present invention.

DETAILED DESCRIPTION OF A PREFERRED MODE

Figure 1:
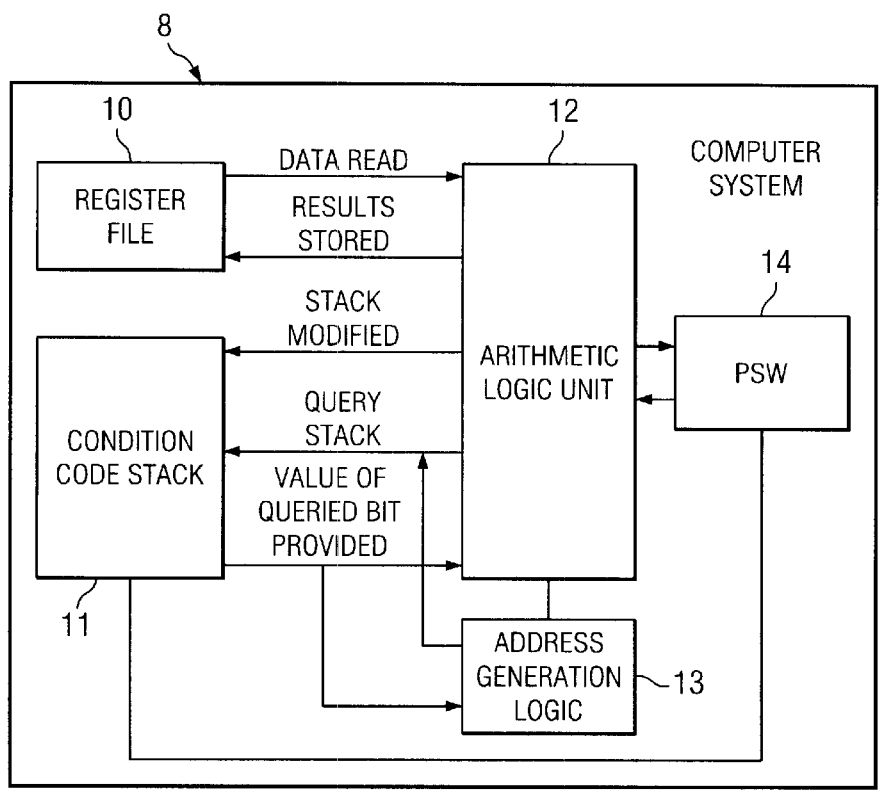
FIG. 1 is a block diagram of a computer system including a register file, a condition code stack, and an arithmetic logic unit (ALU) for operating upon the register file and the condition code stack, in order to determine operational results during processing of control transfer instructions, according to the present invention.

Referring now to FIG. 1, there is shown a block diagram of computer system 8 including a register file 10, a condition code stack 11, an arithmetic logic unit (ALU) 12, and an address generation logic (AGL) circuit 13 for operating upon said register file 10 and said condition code stack 11, in order to determine results of processing control transfer instructions, according to the present invention. The ALU 12 communicates with the register file 10 and with the condition code stack 11 in the course of processing operation. ALU 12 is configured to process arithmetic and logical instructions as well as control transfer instructions, such as conditional jumps for example. Computer system 8 further includes a program status word (PSW) register 14 which contains program status word primary fields including a program counter field, a condition code field, and an other states field, as discussed in detail below. The PSW register 14 references the top of condition code stack 11. The condition code field includes sub-fields such as a carry field, an overflow field, a sign bit, and a spare bit. The ALU 8 engages in read and write operations with respect to the program status word register 14 and its primary fields and its sub-fields 18–21, as will be discussed in greater detail below. To accomplish data and instruction processing, the ALU 12 reads from register file 10 and processes the data and instruction information with arithmetic and logical instructions for example, storing the results of processing in register file 10. As an additional result of processing, the condition code stack 11 is modified at a stack location corresponding to the instruction processing conducted, and the results of processing are stored in the register file 10. Processing then continues with execution of a control transfer instruction such as a conditional jump, based upon a data value read from the condition code stack 11 pursuant to a query by the ALU 12. The queried bit value at a predetermined location in the condition code register 11 is provided to the ALU 12 for execution of the applicable control transfer instruction or instructions. Such a computer system 8 is for example useful in the implementation of an index or pointer system used for accessing a data item that sets the value of a particular condition code. According to one embodiment of the present invention, computer system 8 is programmed with a C programming language construct as follows:

while (c=array[i++]!=0){

. . .

}In this case, the variable "i" is an index for a specified array which is set within a "while" loop. The loop will continue to be in execution for as long as the end of the array is not yet reached. In one case, the end of the array is indicated by the presence of a zero-entry at a particular location of the array. In the assembly language, a temporary register is used according to one embodiment of the present invention to store the original value of "i." According to another embodiment of the present invention, data is copied from one string to another, using pointers, to post increment the pointers, and to stop after a predetermined value, e.g., zero, has been transferred. For example, For(p=destination,q=source;*p++=*q++;)

The old values of the pointers are to be used for data access, to set condition codes that will control branching, such as implementation of a conditional jump for example. In this situation, two increments need to be processed after access without losing the condition codes. By use of a condition code stack 11 in computer system 8 with register file 10 and ALU 12, a reduced operation code space, i.e., "op-code space, is achieved. Use of a condition code register file instead of a condition code stack would require custom software, e.g., compiler code, to determine which of particular sets of condition codes are to be used in particular instructions being processed by ALU 12. The condition code stack 11 according to the present invention is further self-managing. In current known designs, additional bits are required for arithmetic, logical, and control transfer instructions, to specify which condition code is to be used. According to the present invention, only the control transfer instructions require extra instruction bits.

Figure 2:
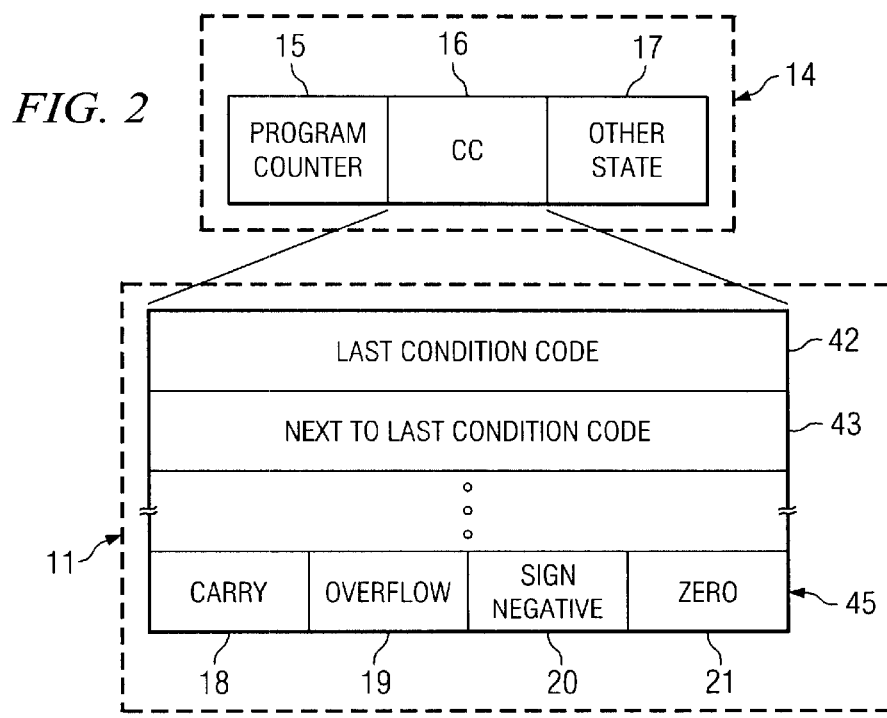
FIG. 2 is a detailed representation of the contents of a program status word in association with a condition code stack according to one embodiment of the present invention.

Referring now to FIG. 2, there is shown a detailed representation of the contents and organization of a program status word (PSW) register 14 in association with a condition code stack 11 according to one embodiment of the present invention. The program status word register 14 contains program status word primary fields including a program counter field 15, a condition code (CC) field 16, and an other states field 17. The condition code field 16 in turn includes sub-fields such as a carry field 18, an overflow field 19, a sign bit 20, and a zero bit 21. The ALU 8 engages in read and write operations with respect to the program status word register 14 and its primary fields 15–17 and its sub-fields 18–21. The condition code stack 11 includes according to one embodiment of the present invention, a plurality number of interlinked registers 42–45 organized as a last-in first-out (LIFO) stack, according to which prior to writing onto the last set of condition code sub-fields at the top of the condition code stack, the respective stack members are shifted downward. This elements the value contents of the lowest stack member. In sequence, the next oldest stack member is read and overwrites the contents of the oldest stack member. When the last condition code is read and written onto the location of the second to last condition code, the top of the condition code stack is available for entry of new condition code information.

Figure 3:
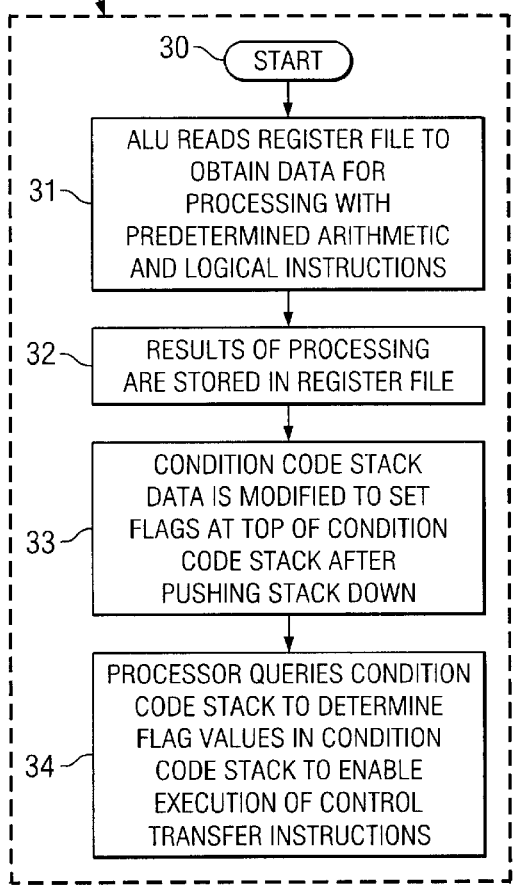
FIG. 3 is a flow chart of a method according to one embodiment of the present invention for implementing a conditional code stack in a computer system to ensure operability of control transfer instructions to implement branching and conditional jumps.

Referring now to FIG. 3, there is shown a flow chart of a method 29 according to one embodiment of the present invention, for implementing a conditional code stack in a computer system to ensure operability of control transfer instructions to implement processing of instructions including branching and conditional jumps. In particular, the method starts 30 operation in computer system 8, and ALU 12 reads 31 a register file 10 to obtain data for enabling execution of predetermined arithmetic and logical instructions. Next, the results of processing are stored 32 in the register file 10. Thereafter, condition code stack data is modified 33 to set flags at the top of the condition code stack, after pushing the rest of the stack 11 down. These flags are determinative of control transfer instruction execution results. Then, to implement control transfer according to the present invention, the ALU 12 queries 34 the condition code stack 11 to determine particular flag values in the condition code stack 11, thereby enabling the execution of the control transfer instruction.

Figure 4:
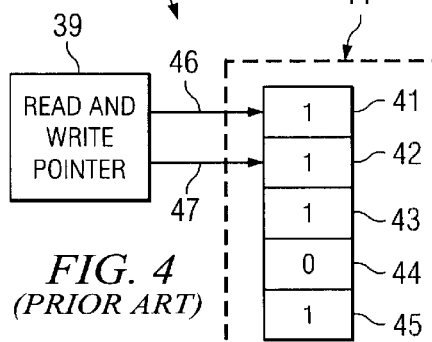
FIG. 4 is a diagram of a conventional implementation of a stack system comprising a combined read and write pointer and a stack construct including a selected plurality of linked single field, single bit stack elements respectively having respective predetermined set bit values written into each of the available fields.

Referring now to FIG. 4, there is shown a diagram of a conventional implementation of a stack system 38 comprising a combined read and write pointer 39 and a stack 11 including single bit stack elements 41–45 respectively having respective predetermined set bit values written into each of the available fields. Prior to writing onto the last set of condition code sub-fields at the top of the condition code stack, respective stack members are shifted downward. This eliminates the contents of the lowest stack member. In sequence, the second oldest stack member is read and then written over the contents of the oldest stack member. The last condition code is then read and written onto the location of the second to last condition code, freeing the top stack position for entry of additional information. As shown in FIG. 4, according to a single bit, single field stack implementation, the stack contents are 11101, respectively in stack elements 41–45. This condition has been established by pushing a "1" though each of the upper positions until it finally resides at the lowest level 45, pushing a "0" through various upper positions until it finally resides at the second lowest level 44; and so on, until a prior top element "1" has been pushed to the second level "42" by a read of the top level with read pointer 46 and a write to the second level with a pointer shift 47. A new top level value "1" is then written by write pointer 46 onto the top of stack 11.

Figure 5:
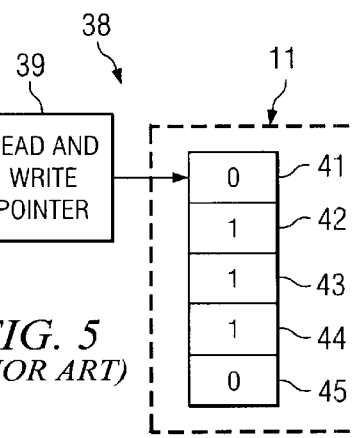
FIG. 5 is a diagram of a conventional implementation of a stack construct of stack system in which the values of stack elements have been shifted downward by action of combined read and write pointer, eliminating the fifth value of the stack construct shown in FIG. 4, and establishing a new first stack value.

Referring now to FIG. 5, there is shown a diagram of a conventional implementation of a stack construct 40 of stack system 38 in which the values of stack elements 41–45 have been shifted downward by action of a combined read and write pointer 39, eliminating the fifth value of the stack construct shown in FIG. 4, and establishing a new first stack value. As a result, the stack contents become 01110, respectively loaded into stack elements 41–45. This result is caused by pushing a "0" though each of the upper positions of the stack 11 until the "0" finally resides at the lowest level 45, pushing a "1" through various upper positions until the "1" finally resides at the second lowest level 44; and so on, until the prior top element "1" has been pushed to the second level "42" of stack 11 by a read of the top stack level with read pointer 46 and a write to the second level with a pointer shift 47. A new top level value "0" is written onto stack 11 by write pointer 46.

Figure 6:
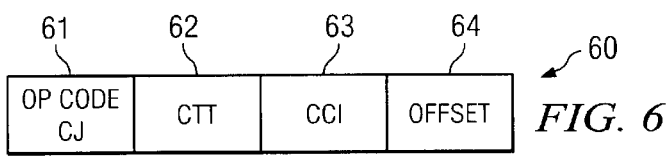
FIG. 6 is a diagram of a representation of a conditional jump (CJ) instruction for use in accordance with the present invention, said conditional jump instruction including an operations code field indicative of the kind of instruction expressed, a condition-to-test (CTT) field specifying the circumstance which determines whether a conditional jump will be implemented or not, a condition code index (CCI) for identifying the particular condition code in the condition code stack to be indexed, and an offset field indicative of the amount the program counter will be offset if the conditional jump is undertaken.

Referring now to FIG. 6, there is shown a diagram of a representation of the architecture of a conditional jump (CJ) instruction 60, as used in accordance with the present invention. The conditional jump instruction 60 includes an operations code field 61 which in this case indicates a conditional jump instruction. The CJ instruction architecture further includes a condition-to-test field (CTT) 62 which specifies the condition to be evaluated to determine whether a conditional jump will be implemented or not. The CJ instruction architecture further includes a condition code index 63 (CCI) for identifying the particular condition code in the condition code stack to be indexed. The CJ instruction 61 architecture further includes an offset field 64 indicative of the amount a program counter is to be offset in implementing a conditional jump operation.

Figure 7A:
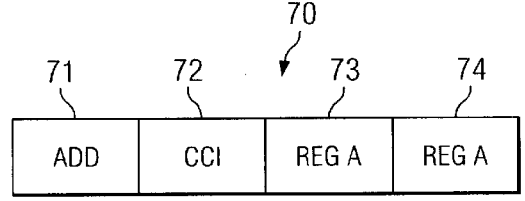
FIG. 7A is a diagram of a representation of an add instruction according to the prior art, in which the add instruction includes an operations code field indicative of the kind of instruction expressed, i.e., an "add," a condition code field, a condition code index (CCI) for identifying the particular condition code in the condition code stack to be indexed, a register A field indicative of a first argument in an add operation, and a register B field indicative of a second argument in an add operation.

Referring now to FIG. 7A, there is shown a diagram of a representation of the architecture of an add instruction 70 according to the prior art. In particular, the add instruction includes an operation code field 71 indicative of the kind of instruction expressed, e.g., an "add" condition code field . The add instruction includes a condition code index (CCI) for identifying the particular condition code in the condition code stack to be indexed. The add instruction architecture further includes a register A field 73 indicative of a first argument in an add operation, and a register B field 74 indicative of a second argument in an add operation.

Figure 7B:
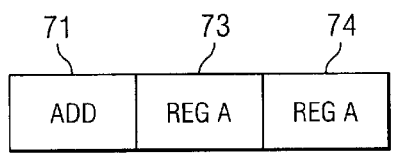
FIG. 7B is a diagram of a representation of an add instruction used with an embodiment of the present invention, the add instruction including an operations code field indicative of the kind of instruction expressed, i.e., an "add," a register A field indicative of a first argument in an add operation, and a register B field indicative of a second argument in an add operation.

Referring now to FIG. 7B, there is shown a diagram of a representation of an add instruction 75 used with an embodiment of the present invention. The add instruction 75 includes an operations code field 71 indicative of the kind of instruction expressed, i.e., an "add." The add instruction includes a register A field 73 indicative of a first argument in an add operation, and a register B field 74 indicative of a second argument in an add operation. To accomplish an add operation, the value of field regA is added to the value of field regB. However, the specification of which the condition code is to be affected is not required, saving instruction code space according to the present invention.

Referring now to FIG. 8, there is shown a diagram of a program counter adjustment system 80 according to the present invention including an instruction register 60 containing a conditional jump instruction. The conditional jump instruction references a particular condition code in condition code stack 11. The program counter adjustment system 80 further includes first and second selector mechanisms respectively 81 and 82, an adder 83, a program counter 84, and first through fourth inverters respectively 85–88 for setting complement values to a particular carry bit value 18, overflow value 19, sign value 20, and zero value 21, according to one embodiment of the present invention. The inverters 85–88 are examples of logic circuitry that could be used to make desired input values for selector mechanism 81. More complicated logic can be implemented to substitute for one or more of the inverters 85–88. Accordingly, the instruction in register 60 selects a particular condition to test with first selector mechanism 81 (in this example a sign value). The selector mechanism 81 can choose any one of inputs 0–7 according to the criteria set by CTT 62. According to the example shown, the sign value in sign code 20 is passed directly as a control to second selector mechanism 81, without inversion or other logical change. The instruction further identifies the offset in condition code stack 11 corresponding to a particular one of the condition codes, in this case condition code 44, in condition code stack 11. First selector mechanism 81 then provides the sign from conditioning code 44 to second mechanism selector 82. The second mechanism selector 82 further receives the amount of offset from the instruction in register 60 or a "1" value from "1" value source 88, resulting in a positive or negative offset adjustment in program counter 84 through adder 83. The adder 83 adds either the "1" value or the offset value 64 taken either in a positive or negative sense to the current program counter 84 setting.

Referring now to FIG. 9, there is shown a diagram of the construction of a program status word 90 including a program counter field 91, a plurality of condition code fields 92–95 in series constituting a horizontal condition code stack according to one embodiment of the present invention, and an other state field 96, according to the present invention. In particular, the condition code stack according to the present invention is a series of contiguous fields arranged within the program status word 90 itself. Thus, the selector system 80 can identify offsets within a horizontal stack as shown, as well as a vertical stack 11.

What is claimed is:

1. A method of executing a control transfer instruction with a condition code stack, comprising:

identifying from the control transfer instruction a transfer condition in a condition code read from the condition code stack;

said condition code stack having a plurality of entries each for storing a condition code;

identifying the condition code in the condition code stack, said condition code have a condition code index value specified in the control transfer instruction; and modifying a program counter with an offset value indicated in accordance with the identified value of the condition to transfer.

2. The method according to claim 1 wherein the control transfer instruction is selected from a group including a conditional jump, a subroutine, or a predicated code expression.

3. The method according to claim 1 wherein the condition code stack is accessed by a pointer value.

4. The method according to claim 1 wherein the condition code stack is accessed by an index value.

5. The method according to claim 1 including executing code operating on an indexed array until the end of the array is reached.

6. A computer system, comprising:

a register file;

an arithmetic logic unit for reading data from said register file, said arithmetic logic unit configured to conduct data processing of read data and for storing results of processing the data in said register file;

a condition code stack having a plurality of entries each for storing a condition code;

the condition code stack configured to hold data indicative of results of data processing by said arithmetic logic unit; said arithmetic logic unit configured to query said condition code stack for predetermined bit values to determine implementation of a branching operation controlled by said arithmetic logic unit.

7. The computer system according to claim 6 wherein the branching operation is a conditional jump.

8. The computer system according to claim 7 wherein said condition code stack is configured to be able to be accessed by at least a single pointer value.

9. The computer system according to claim 6 wherein the condition code stack is configured to be able to be accessed by at least a single index value.

10. A program counter adjustment system, including:

a condition code stack having a plurality of entries each for storing a condition code;

a first selector for receiving condition-to-transfer information for transferring data from a selected condition code field of a condition code received from said condition code stack; and a second selector for receiving offset information for characterization by condition-to-transfer information received by first selector, said second selector being configured to provide program counter adjustment values.

11. The program counter adjustment system according to claim 10, including a program counter mechanism which is adjustable with program counter adjustment values.

12. The program counter adjustment system according to claim 10 further including an adder.

13. The program counter adjustment system according to claim 10 including a means for determining program counter adjustment values.

* * * * *